United States Patent [19]

Bobb et al.

[11] 4,438,517
[45] Mar. 20, 1984

[54] INTERFEROMETRICALLY TUNED LASER RESONATOR

[75] Inventors: Lloyd C. Bobb, Willow Grove; Michael Rankin, Hatboro; Gerald D. Ferguson, Yardley, all of Pa.

[73] Assignee: The United States of America as represented by the Secretary of the Navy, Washington, D.C.

[21] Appl. No.: 210,902

[22] Filed: Nov. 28, 1980

[51] Int. Cl.³ .................................................. H01S 3/08
[52] U.S. Cl. ........................................ 372/99; 372/92; 372/107; 372/19; 372/29
[58] Field of Search .................. 372/20, 32, 102, 99, 372/108, 18, 12, 92, 93, 107, 19

[56] References Cited

U.S. PATENT DOCUMENTS

| | | | |
|---|---|---|---|
| 3,443,243 | 5/1969 | Patel | 372/20 |
| 3,564,454 | 2/1971 | Hook et al. | 372/12 |
| 3,571,744 | 3/1971 | Hook | 372/12 |
| 3,624,551 | 11/1971 | Gudmondsen | 372/20 |
| 3,670,258 | 6/1972 | Magnante | 372/12 |
| 3,694,769 | 9/1972 | Hook et al. | 372/12 |
| 3,753,148 | 8/1973 | Billman | 372/20 |
| 4,229,710 | 10/1980 | Shoshan | 372/20 |

Primary Examiner—William L. Sikes
Assistant Examiner—Léon Scott, Jr.
Attorney, Agent, or Firm—R. S. Sciascia; Henry Hansen

[57] ABSTRACT

An interferometrically tuned laser resonator for selectively resonating at a desired wavelength or fluorescent line. A dielectric reflector having reflectance characteristics which shift toward shorter wavelengths at incident angles not normal thereto is rotatably mounted at one end of a laser cavity along its axis. Rotation of the reflector permits adjustment of the incidence angle to obtain maximum cavity gain at a desired fluorescent line over adjacent competing lines.

11 Claims, 3 Drawing Figures

INTERFEROMETRICALLY TUNED LASER RESONATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to lasers, and more particularly to an improved interferometrically tuned laser resonator.

Laser resonators are often resonance tuned for maximum cavity gain by establishing an optical path repetitive for only a selected one of a plurality of different wavelengths emitted by a lasing material. One current method for tuning the laser resonator at one fluorescent line or wavelength while not affecting adjacent wavelengths utilizes a reflective device specially fabricated with dichroic coatings having the precise reflectance characteristics at the desired wavelength. Due to unavoidable variations in the characteristics during manufacture, the reflector must be hand picked for the desired wavelength. This makes the reflector very expensive as well as difficult to obtain. In another method, tuning is achieved with a prism which angularly disperses the laser beam according to wavelength, and a reflector selects one wavelength for repetitive traverse through the laser medium. In this method, the angular dispersion of the wavelengths is generally insufficient to single out one line among closely spaced lines, especially in the infrared band.

SUMMARY OF THE INVENTION

Accordingly, it is an object of the present invention to provide a laser resonator which can use reflectors with readily available dichroic coatings to maximize the laser cavity gain at one fluorescent line over adjacent lines. Another object of the invention is to provide a simple and inexpensive means for altering the reflectance characteristics of commercially available dielectric coatings and optimize cavity resonance. Still another object of the invention is to provide means for relaxing the exactitude of reflectance characteristics of dielectric coatings and allow more freedom in maximizing the laser output.

Briefly, these and other objects of the invention are accomplished with an optical system which selectively resonates a laser cavity at a desired wavelength of fluorescent emission. A dielectric reflector having reflectance characteristics that shift toward shorter wavelengths for incident angles not normal thereto is rotatably mounted at one end of a resonator cavity along the optical axis. Rotation of the reflector permits adjustment of the incidence angle of the fluorescence thereby optimizing the gain of the cavity for the desired wavelength while suppressing the adjacent competing wavelengths.

Other objects and features of the invention will be readily apparent to those skilled in the art from the following description made in connection with the accompanying drawings wherein:

DESCRIPTION OF THE PREFERRED EMBODIMENT

Figure 1:
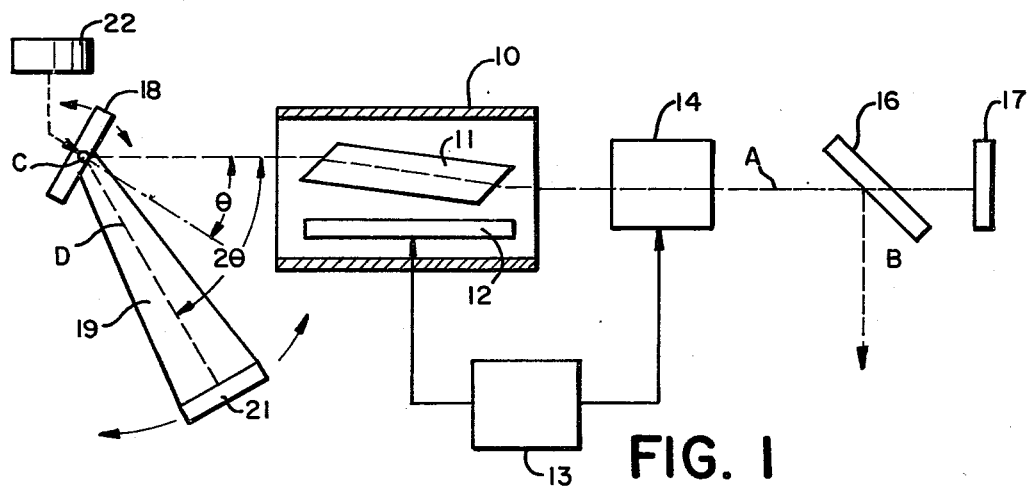
FIG. 1 is a schematic diagram of one preferred embodiment of an interferometrically tuned laser resonator according to the invention.

Referring now to the drawings wherein like characters designate like or corresponding parts throughout the several views, there is shown in FIG. 1 a laser resonator including a highly reflective cavity 10 enclosing a lasing medium or rod 11, such as a $Nd^{3+}$:YAG or $Ho^{3+}$:YLF crystal, positioned along the optical axis A with the ends cut as the Brewster angle for emitting vertically polarized fluorescent lines. A light discharge lamp 12 within cavity 10 and adjacent to the rod 11 provides the input radiation energy for optically pumping rod 11 in the conventional manner. A controller 13 provides electrical energy to lamp 12 in a conventional manner to start the pumping cycle.

Disposed at one end of cavity 10 along the optical axis A are polarizing switch 14 such as a Pockels cell electrically energized by a controller 13, a dielectric-coated, reflecting polarizer 16 inclined relative to axis A, and a total reflecting mirror 17 normal to axis A. Switch 14 acts as a polarization rotator when energized by controller 13 to rotate the direction of polarization through a predetermined angle depending upon the voltage applied. When switch 14 is not energized, the vertically polarized light from rod 11 is unaffected and passes to polarizer 16. Polarizer 16 is highly reflective of horizontally polarized light but will transmit the vertically polarized light to mirror 17 for reflection back through cell 14 along axis A. At a predetermined time in the pumping cycle when the energy level of the desired fluorescent line is maximum, controller 13 applies a sufficient voltage to switch 14 to rotate the plane of polarization of the light entering cell 14 90° or horizontally. The horizontally polarized light now directed to polarizer 16 is reflected out of the resonator along an axis B as a useful laser beam.

Figure 2A:
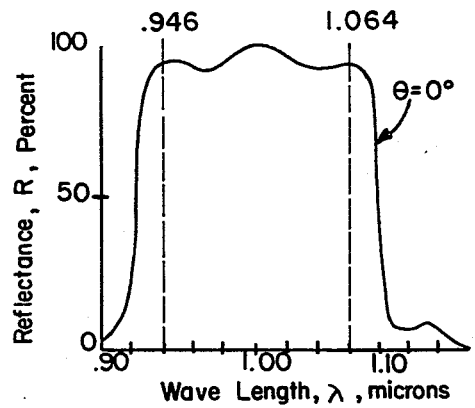
FIGS. 2a and 2b are typical reflectance characteristics of a dielectric reflector as applied to the resonator of FIG. 1.
Figure 2B:
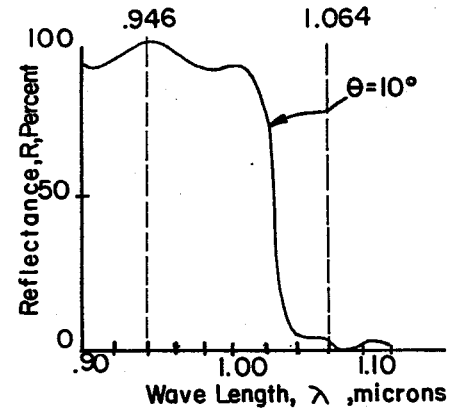

Disposed at the other end of cavity 10 along axis A is a dielectric reflector 18 rotatable on an axis C normal to axis A for varying the angle of incidence $\theta$ of light emitted by rod 11. Reflector 18 includes a dichroic coating having angle tuning characteristics suitable for reflecting more of one wavelength of the light than others emitted by the lasing medium of rod 11. Low energy light not reflected by reflector 18 passes out of the resonator along axis A. FIGS. 2a and 2b illustrate reflectance characteristics as measured on a commercially available dielectric reflector selected for use with a $Nd^3$:YAG medium. FIG. 2a shows the reflectance at 0° incidence for light wavelengths in the band of $0.900\mu$–$1.40\mu$ (microns) with maximum reflectance at $1.00\mu$. By changing the light incidence to 10° in either direction, FIG. 2b, the maximum reflectance shifts to a shorter wavelength of $0.946\mu$. The amount of shift with angle of incidence depends upon the dielectric type (narrow band, shortpass, longpass) and design (thickness, sequence of successive layers, index of refraction, and uniformity), but shifts of 0.0015μ–0.0020μ per degree are not uncommon.

An arm 19 pivotal about axis C supports a total reflecting mirror 21 in a plane normal to an optical path D which passes through the intersection of axes A and C, and which is normal to axis C. A manual adjuster 22 operatively connected to reflector 18 and arm 19 rotates arm 19 at twice the incidence angle $\theta$ in order that mirror 21 will always return the fluorescent lines reflected by reflector 18 back along axis A to rod 11.

Operation of the resonator as applied to a $Nd^{3+}$: YAG lasing medium is as follows. Superimposed on FIGS. 2a and 2b are wavelengths 0.946μ and 1.064μ for two major fluorescent lines emitted by the lasing medium of which it is desired to enhance the gain at 0.946μ and suppress 1.064μ. Other minor lines, not shown, emitted by the medium (1.052μ, 1.055μ and 1.061μ) are very close to 1.064μ, but are well-separated from the 0.946μ line. There are no competing lines between 0.946μ and 1.052μ, hence the separation of lines is abrupt and sufficient to enable angle tuning at 0.946μ practical. In this example, reflector 18 is displaced at the incidence angle $\theta = 10°$ (FIG. 2b) to shift its maximum reflectance to the 0.946μ line. The 1.064μ line and its competing lines are now at minimum reflectance.

When controller 13 energizes lamp 12, vertically polarized light emits from both ends of rod 11. The light directed toward mirror 17 passes through switch 14 and returns to rod 11 to be further pumped. Light directed toward reflector 18, which is at 0.946μ is reflected along axis D toward mirror 21 and returned to rod 11 for further pumping. Other lines pass through reflector 18 along axis A and out of the resonator. Thus, only the 0.946μ line has a net gain in a round trip through the resonator. When the intensity of the 0.946μ line in the resonator reaches a useful output level, controller 13 energizes switch 14, rotating the vertically polarized light to the horizontal. The polarizer 16 thereby becomes highly reflective and dumps the light along the axis B. Thereby, the cavity gain of light at the 0.946μ wavelength is optimized while the wavelengths of 0.152μ to 1.064μ are suppressed.

Fluorescent lines of other laser mediums can be similarly enhanced with dichroic polarizers having corresponding reflectance characteristics over the wavelengths of interest.

Figure 3:
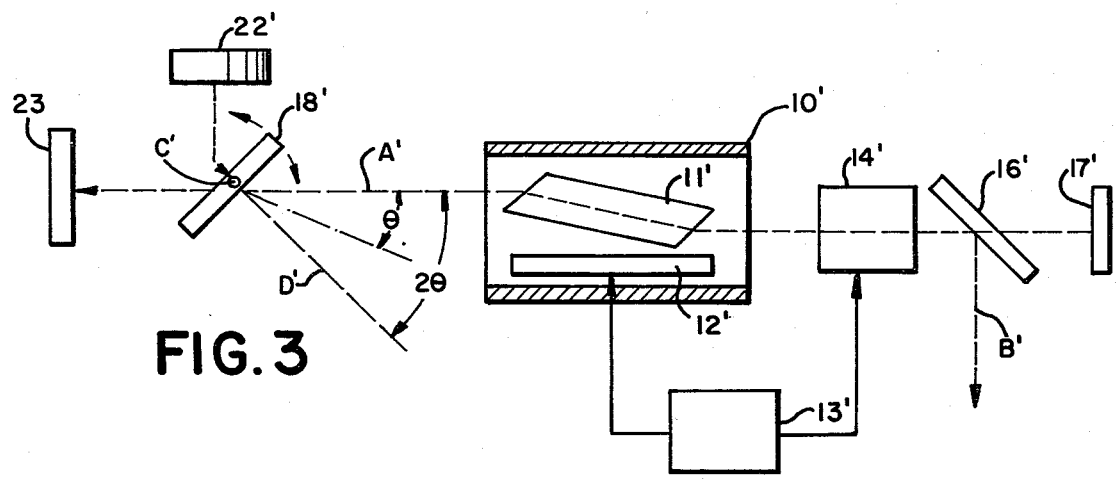
FIG. 3 is a schematic diagram of another embodiment of the resonator according to the invention.

The alternate embodiment of FIG. 3 uses a rotatable dichroic reflector in a transmission mode to enhance the 1.064μ fluorescent line and suppress the 0.946μ line. The vertically polarized light emitted from a rod 11' on the side opposite from a switch 14' is directed to a reflector 18' having a dichroic coating capable of being angle tuned by adjuster 22' to pass the line 1.064μ to a mirror 23 along the axis A', and to reflect line 0.946μ along the optical axis D' from the resonator. When the desired energy level of line 1.064μ is reached, switch 14' is energized by controller 13' to horizontally polarize the light and cause it to reflect out of the resonator along the axis B'.

Some of the many advantages of the invention should now be apparent from the foregoing description. For example, a laser resonator of simple configuration is provided which utilizes readily available dielectric coatings for maximizing the laser cavity gain at one fluorescence line over adjacent lines by angle tuning the dielectric coating. The exactitude for coatings of specific wavelengths are substantially relaxed thereby reducing their costs. The laser technologist is also allowed more opportunity to maximize the laser outputs by merely changing the reflectance characteristics as a function of the angle of incidence.

Obviously many modifications and variations of the present invention are possible in light of the above teachings. It is therefore to be understood that within the scope of the appended claims the invention may be practiced otherwise than as specifically described.

What is claimed is:

1. An interferometrically tuned laser resonator comprising, in combination:
    optical means for emitting polarized radiation of fluorescent lines of a first polarity in opposite directions along a first optical axis when energized by a first signal;
    switching means positioned to pass the radiation in one of the directions and for changing the first polarity to a second polarity when energized by a second signal;
    first reflector means positioned to receive the radiation from said switching means for passing the radiation of the first polarity along the first optical axis, and for reflecting the radiation of the second polarity as a useful output along a second optical axis angularly displaced from the first optical axis;
    second reflector means positioned to receive the radiation from said first reflector means for reflecting the radiation back along said first optical axis;
    third reflector means positioned to receive the radiation in the other of the directions for interferometrically reflecting selected ones of the fluorescence lines back along the first optical axis; and
    controller means connected to said optical means and said switching means for providing said first and second signals in timed sequence, the elapsed time between the first and second signals being sufficient for the radiation of the first polarity to reach a useful output level.

2. A resonator according to claim 1 wherein:
    said third reflector means having reflectance characteristics which shift with change in angle of radiation incidence.

3. A resonator according to claim 2 further comprising, in combination:
    adjusting means connected to said third reflecting means for setting the radiation incidence at an angle corresponding to the maximum reflectance of the selected lines.

4. A resonator according to claim 3 wherein:
    said third reflector means includes a first reflector angularly positioned by said adjusting means for reflecting the selected lines along a third axis, and a second reflector positioned in said adjusting means to receive the selected lines from said first reflector for reflecting the selected lines back along said third axis and for passing the remaining fluorescent lines along the first axis out of the resonator.

5. A resonator according to claim 4 wherein the reflectance of the selected lines is maximum at the angular position of said first reflector.

6. A resonator according to claim 5 wherein:
    said first reflector comprises a dichroic mirror.

7. A resonator according to claim 6 wherein:
    said dichroic mirror comprises an optical element having a dielectric coating.

8. A resonator according to claim 6 wherein:

the reflectance of the selected lines is minimum at the angular position of said first reflector.

9. A resonator according to claim 8 wherein:
said first reflector comprises a dichroic mirror.

10. A resonator according to claim 9 wherein:
said dichroic mirror comprises an optical element having a dielectric coating.

11. A resonator according to claim 3 wherein: said third reflector means includes a first reflector angularly positioned by said adjusting means for passing the selected lines along the first axis and for reflecting the remaining fluorescent lines along a third axis out of the resonator, and a second reflector positioned to receive the selected lines passed through the first reflector for reflecting the first lines back along the first axis.

* * * * *